(12) United States Patent
Madsen et al.

(10) Patent No.: US 12,722,348 B2
(45) Date of Patent: Sep. 1, 2026

(54) METHODS OF FORMING A COMPOSITE STRUCTURE AND ASSOCIATED AUTOMATED MANUFACTURING SYSTEMS AND COMPONENTS

(71) Applicant: Northrop Grumman Systems Corporation, Falls Church, VA (US)

(72) Inventors: Christopher J. Madsen, Layton, UT (US); Barrett B. Milenski, Salt Lake City, UT (US); Christopher Palmer, Syracuse, UT (US)

(73) Assignee: NORTHROPGRUMMAN SYSTEMS CORPORATION, Falls Church, VA (US)

( * ) Notice: Subject to any disclaimer, the term of this patent is extended or adjusted under 35 U.S.C. 154(b) by 174 days.

(21) Appl. No.: 18/633,329

(22) Filed: Apr. 11, 2024

(65) Prior Publication Data

US 2025/0319672 A1 Oct. 16, 2025

(51) Int. Cl.

| | |
|---|---|
| ***B29C 70/38*** | (2006.01) |
| ***B29C 70/54*** | (2006.01) |
| ***G06F 30/20*** | (2020.01) |
| *B29L 31/30* | (2006.01) |
| *G06F 113/22* | (2020.01) |
| *G06F 113/26* | (2020.01) |
| *G06F 119/18* | (2020.01) |

(52) U.S. Cl.

CPC ............ *B29C 70/382* (2013.01); *B29C 70/38* (2013.01); *B29C 70/54* (2013.01); *G06F 30/20* (2020.01); *G06F 2113/22* (2020.01); *G06F 2113/26* (2020.01); *G06F 2119/18* (2020.01)

(58) Field of Classification Search

CPC ...................................................... B29C 70/00

See application file for complete search history.

(56) References Cited

U.S. PATENT DOCUMENTS

| | | | |
|---|---|---|---|
| 9,186,849 | B2 | 11/2015 | Spellman et al. |
| 9,586,367 | B2 | 3/2017 | Drewett et al. |

(Continued)

FOREIGN PATENT DOCUMENTS

| | | | |
|---|---|---|---|
| CA | 2938230 | A1 | 2/2017 |

OTHER PUBLICATIONS

Duch et al: “Automatic process control of an automated fibre placement machine” ScienceDirect, Composites Part A, vol. 168, May 1, 2023 (May 1, 2023).

(Continued)

*Primary Examiner* — Atul P. Khare

(74) *Attorney, Agent, or Firm* — KATTEN MUCHIN ROSENMAN LLP

(57) ABSTRACT

A method for manufacturing a composite structure includes receiving measurements of properties of a composite sheet. The method further includes receiving historical properties of previous composite structures. The method also includes determining a number of composite plies for each section of the composite structure to achieve a desired final composite thickness based on the properties of the composite sheet and the historical properties of the previous composite structures. The method further includes laying up a plurality of composite plies to form an initial shape including the number of composite plies in each section determined to achieve the desired final composite thickness.

4 Claims, 5 Drawing Sheets

(56) References Cited

U.S. PATENT DOCUMENTS

| | | | | |
|---|---|---|---|---|
| 9,675,990 | B2 * | 6/2017 | Ellis | G01N 29/4472 |
| 10,399,276 | B2 | 9/2019 | Madsen et al. | |
| 11,370,181 | B2 | 6/2022 | Van Nieuwenhove et al. | |
| 11,400,661 | B2 * | 8/2022 | Meure | B29C 43/12 |
| 2012/0073726 | A1 * | 3/2012 | Koeniger | B29C 70/382 156/356 |
| 2019/0344513 | A1 | 11/2019 | Louie et al. | |
| 2024/0109264 | A1 | 4/2024 | Gülink et al. | |

OTHER PUBLICATIONS

International Search Report for International Application No. PCT/US2025/022782, mailed Jul. 23, 2025, 4 pages.

International Written Opinion for International Application No. PCT/US2025/022782, mailed Jul. 23, 2025, 7 pages.

* cited by examiner

METHODS OF FORMING A COMPOSITE STRUCTURE AND ASSOCIATED AUTOMATED MANUFACTURING SYSTEMS AND COMPONENTS

TECHNICAL FIELD

Embodiments of the disclosure generally relate to lay-up forming tooling. In particular, embodiments of the disclosure relate to methods of forming composite structures and the associated lay-up forming systems, lay-up forming tools, and associated components and structures.

BACKGROUND

Composite layup processes may be used to form high-strength lightweight parts. High-strength lightweight parts may be used for structures and devices, such as automobiles, aircraft, marine vehicles, space structures, engines, turbines, etc. Composite layup processes involve laying up multiple layers (lamina) or plies of composite material to achieve a desired final thickness and shape of an associated composite structure (laminate). Structure designs may include a number of plies and the shape of the plies to define a final structure size and shape. Additional plies may add additional strength and thickness to the structure, while reducing the number of plies may reduce the weight and thickness of the associated structure.

BRIEF SUMMARY

Embodiments of the disclosure include a method for manufacturing a composite structure. The method includes receiving measurements of properties of a composite sheet. The method further includes receiving historical properties of previous composite structures. The method also includes determining a number of composite plies for each section of the composite structure to achieve a desired final composite thickness based on the properties of the composite sheet and the historical properties of the previous composite structures. The method further includes laying up a plurality of composite plies to form an initial shape including the number of composite plies in each section determined to achieve the desired final composite thickness.

Other embodiments of the disclosure include an automated manufacturing system for controlling layup of a composite structure. The system includes a layup system configured to receive one or more fiber tows as an input material and layup of the one or more fiber tows to form a composite structure of one or more laid up plies. The system further includes one or more sensors configured to measure properties of the one or more fiber tows during the layup of the one or more fiber tows. The system also includes a controller. The controller is configured to receive the properties measured by the one or more sensors. The controller is further configured to compare the properties measured by the one or more sensors to historical data. The controller is also configured to adjust a feed-through of the one or more fiber tows during the layup, including adjusting a number of plies being laid up to compensate for a variation in the layup as provided by the properties measured by the one or more sensors during the layup.

Another embodiment of the disclosure includes a control system for an automated manufacturing system. The control system includes a controller including a processor, a memory device, and a non-transitory computer-readable medium storing instructions thereon. The instructions cause the processor to receive measurements of properties of a composite sheet. The instructions further cause the processor to receive historical properties of previous composite structures. The instructions also cause the processor to receive a layup program including layup instructions for a composite structure and desired final dimensions. The instructions further cause the processor to determine a predicted thickness of the composite structure based at least on the layup program, the measurements of the properties of the composite sheet, and the historical properties of the previous composite structures. The instructions also cause the processor to compare the predicted thickness of the composite structure to the desired final dimensions. The instructions further cause the processor to adjust the layup program until the predicted thickness of the composite structure is substantially the same as the desired final dimensions. The instructions also cause the processor to construct the composite structure according to the layup program as adjusted.

BRIEF DESCRIPTION OF THE DRAWINGS

While the specification concludes with claims particularly pointing out and distinctly claiming embodiments of the disclosure, the advantages of embodiments of the disclosure may be more readily ascertained from the following description of embodiments of the disclosure when read in conjunction with the accompanying drawings in which:

DETAILED DESCRIPTION

Figure 1:
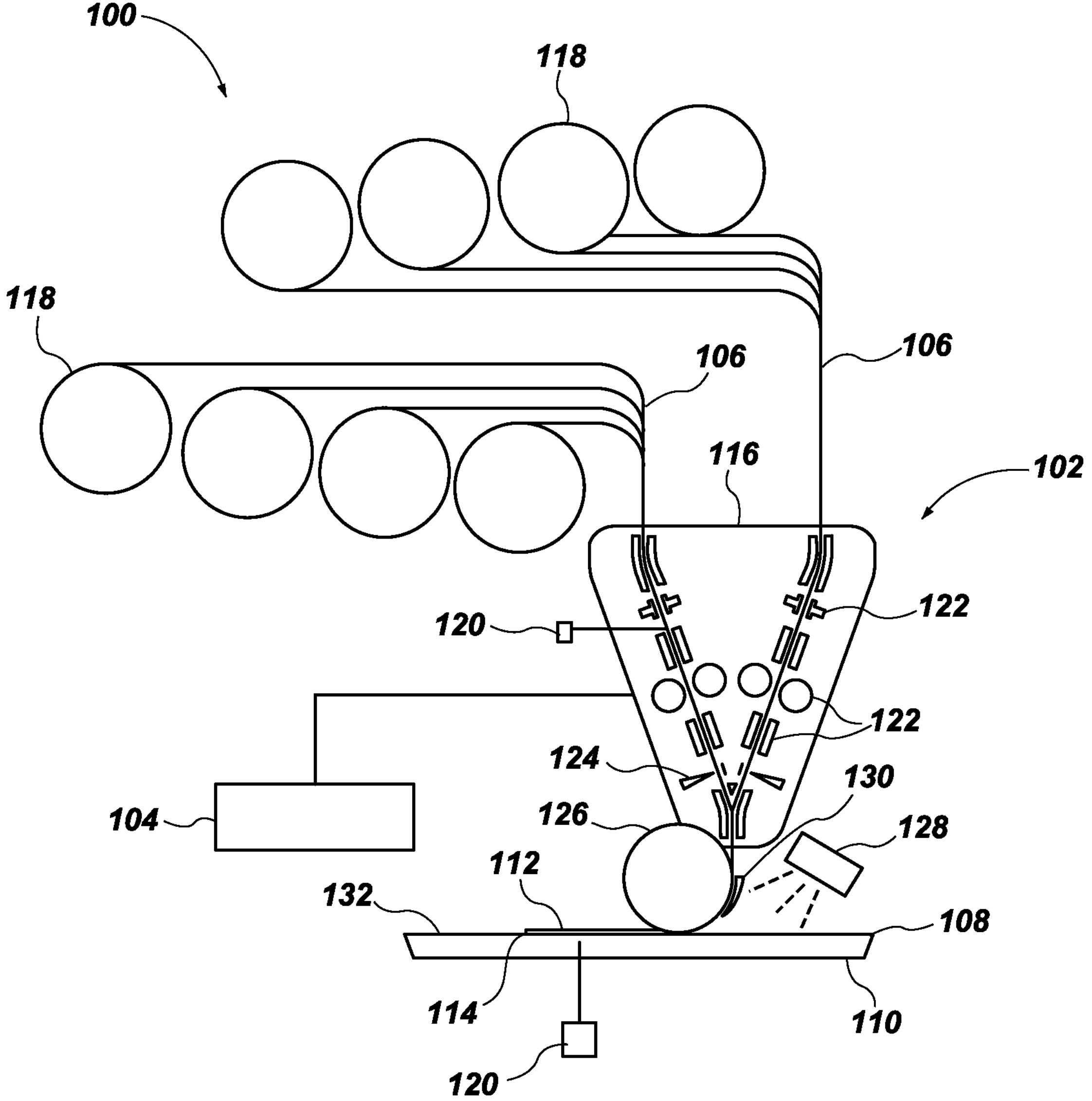
FIG. 1 illustrates a schematic view of a manufacturing system in accordance with embodiments of the disclosure.

The following description provides specific details, such as material compositions, shapes, and sizes, in order to provide a thorough description of embodiments of the disclosure. However, a person of ordinary skill in the art would understand that the embodiments of the disclosure may be practiced without employing these specific details. Indeed, the embodiments of the disclosure may be practiced in conjunction with conventional techniques employed in the industry.

Drawings presented herein are for illustrative purposes only and are not meant to be actual views of any particular material, component, structure, device, or system. Variations from the shapes depicted in the drawings as a result, for example, of manufacturing techniques and/or tolerances, are to be expected. Thus, embodiments described herein are not to be construed as being limited to the particular shapes or regions as illustrated, but include deviations in shapes that result, for example, from manufacturing. For example, a region illustrated or described as box-shaped may have rough and/or nonlinear features, and a region illustrated or described as round may include some rough and/or linear features. Moreover, sharp angles that are illustrated may be rounded, and vice versa. Thus, the regions illustrated in the figures are schematic in nature, and their shapes are not intended to illustrate the precise shape of a region and do not limit the scope of the claims. The drawings are not necessarily to scale. Additionally, elements common between figures may retain the same numerical designation.

As used herein, the terms “configured” and “configuration” refer to a size, a shape, a material composition, a material distribution, orientation, and arrangement of at least one feature (e.g., one or more of at least one structure, at least one material, at least one region, at least one device) facilitating use of the at least one feature in a pre-determined way.

As used herein, the term “substantially” in reference to a given parameter means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, “about” or “approximately” in reference to a numerical value for a particular parameter is inclusive of the numerical value and a degree of variance from the numerical value that one of ordinary skill in the art would understand is within acceptable tolerances for the particular parameter. For example, “about” or “approximately” in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, relational terms, such as “beneath,” “below,” “lower,” “bottom,” “above,” “upper,” “top,” “lead,” “leading,” “trailing,” “left,” “right,” and the like, may be used for ease of description to describe one element’s or feature’s relationship to another element(s) or feature(s) as illustrated in the drawings. Unless otherwise specified, the spatially relative terms are intended to encompass different orientations of the materials in addition to the orientation depicted in the figures. For example, if materials in the figures are inverted, elements described as “below” or “beneath” or “under” or “on bottom of” other elements or features would then be oriented “above” or “on top of” the other elements or features. Thus, the term “below” can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms “a,” “an,” and “the” are intended to include the plural forms as well, unless the context clearly indicates otherwise.

As used herein, the term “and/or” means and includes any and all combinations of one or more of the associated listed items.

As used herein, the term “pre-preg” means and includes a fiber material, such as a fiber tow or fiber sheet that is pre-impregnated with matrix. The matrix may include material such as a thermoset or thermoplastic resin or other materials such a ceramic slurry.

As used herein, the term “processor” means and includes any machine capable of performing the calculations, or computations, to perform the tasks of the disclosure, and to control the mechanical and electrical devices in the disclosure. A “processor” includes any machine that is capable of accepting a structured input and/or of processing the input in accordance with prescribed rules to produce an output, as will be understood by those skilled in the art.

Composite layup processes may be used to form high-strength, lightweight parts for complex structures, such as aircraft, automobiles, aircraft engines, turbines, etc. Many of the complex structures may have tight engineering tolerances to achieve the complex operation associated with the device, such as aerodynamic performance (e.g., high speeds, high-speed maneuvers, drag reductions, lift, downforce, etc.) and minimize observability (e.g., minimize visibility to radar or sonar systems). Composite layup processes involve laying up multiple layers or plies of composite material to achieve a desired final thickness and shape (e.g., desired dimensions) of an associated composite structure. While the tolerances of the individual plies of the composite materials may be within the relatively tight engineering tolerances of the complex parts, tolerance stack-up may result in the final parts not meeting the tight engineering tolerances. Other characteristics of the associated composite material may similarly effect a final thickness of the associated plies and composite structure after the curing process, such as matrix percentages, fiber percentages, matrix densities, etc. Again, these characteristics may each be within the associated design tolerances for a single ply of material but the minor differences may be exacerbated by tolerance stack-up to result in the final composite structure being outside of the engineering tolerances.

The parts must then be modified (e.g., corrected) during post processing by mechanically removing material after the curing process through final machining processes or manually adding additional plies after the part is cured to bring the composite structure within the respective engineering tolerances. These processes add significant expense to the production of the associated parts. This disclosure is directed to a method and system for producing composite structures that account for the differences in materials and adjusts the manufacturing process for the respective composite structures in situ to reduce post processing corrective action.

FIG. 1 illustrates a composite automated manufacturing system 100, including an automated layup system 102 and a controller 104. The layup system 102 is configured to receive one or more fiber tows 106, as input or parent material, to form a composite part 108. The automated manufacturing system 100 may be used for controlling the thickness and weight of a composite part 108, such as low-weight, high-strength aircraft and automotive parts. The automated manufacturing system 100 may be configured to layup the one or more fiber tows 106 on to a substrate 110, to form a composite structure 112 of one or more laid up plies 114. As used herein, the term “substrate” includes a film, a mold, a tool, or the like used for fabrication of a composite structure. The substrate 110 may be manually or automatically placed in the automated manufacturing system 100 in a desired location. The substrate 110 may be operably provided with indicia, pins, or other features for use in determining and/or aligning the substrate 110 relative to the automated manufacturing system 100. In some embodiments, the automated manufacturing system 100 may utilize pre-preg materials as the fiber tows 106. In other embodiments, the automated manufacturing system 100 may utilize dry fiber materials as the fiber tows 106 and include a device for delivering a matrix after the fiber tows 106 are laid up in plies 114 over the substrate 110. The controller 104 may be a computing unit or computer, operable to control the automated manufacturing system 100. For example, the controller 104 may include a layup program stored as instructions in a memory system of the controller 104 that when executed by a processor of the controller 104 may cause the controller 104 to control the automated manufacturing system 100 in accordance with the instructions of the layup program.

The automated manufacturing system 100 illustrated in FIG. 1 includes a fiber-dispensing device 116 configured to feed the one or more fiber tows 106 onto the substrate 110. The automated manufacturing system 100 may be configured to move each of the one or more fiber tows 106 at a respective fiber speed. The fiber-dispensing device 116 may be configured to separately feed each of the one or more fiber tows 106, such that the fiber tows 106 can be fed at different rates or at the same rate, depending upon design parameters and in response to the instructions from the controller 104. In some embodiments, the fiber-dispensing device 116 is in communication with one or more spools 118 onto which each of the fiber tows 106 of the one or more fiber tows 106 is initially wound.

The one or more fiber tows 106 may include any suitable reinforcing material, such as, relatively continuous fibers, pre-preg fiber tows, pre-preg sheets, unidirectional fiber arrays, woven fiber arrays, etc. The fibers in the associated fiber tows 106 may include without limitation, glass fibers, carbon fibers, graphite fibers, basalt fibers, polymeric fibers, including aramide and boron filaments, silica fibers, copper fibers and the like, or combinations thereof. The fibers may be non-conductive or conductive, depending upon the desired application of the composite fiber.

The controller 104 may be configured to respond to measurement data and historical data to provide adjustments to the automated manufacturing system 100 based on a calculated compensation factor. In some embodiments, measurement data may include one or more samplings of at least one of a weight of the one or more fiber tows 106, a weight of the composite structure 112 during fabrication, a thickness of the one or more fiber tows 106, or a thickness of the composite structure 112 during fabrication. The measurement data may also include measurements that may be captured externally to the automated manufacturing system 100 and input by a user, such as matrix percentages of the one or more fiber tows 106, fiber percentages of the one or more fiber tows 106, matrix density of the one or more fiber tows 106, area density (also known as areal density or area weight) etc. The historical data may include measurement data from previously constructed composite parts 108, including measurement data taken during the layup process and final measurements taken after the layup process and after a cure process. The controller 104 is configured to adjust the layup program, more particularly the feed-through of the one or more fiber tows 106, in response to the measurement data and a comparison between the measurement data and the historical data, to compensate for a variations in the fiber tows 106 or composite structure 112 during build. Such adjustments may include, but are not limited to, one or more of a change in the number of plies being laid up to form the composite structure 112 and/or a change in a length of the one or more fiber tows 106 within the automated manufacturing system 100 using feedback based on measurement data of the one or more samplings.

The automated manufacturing system 100 may include one or more sensors 120 for inline monitoring/sampling at least one of a weight or volume of the one or more fiber tows 106, a weight of the composite structure 112 during build, a thickness of the one or more fiber tows 106, area density of the one or more fiber tows 106, an area density of the composite structure 112 during build, and a thickness of the composite structure 112 during build. The inline monitoring/sampling may be conducted continuously or may be conducted periodically. Although a single sensor 120 is indicated in FIG. 1, a plurality of sensors 120 may be employed. For example, in some embodiments, one sensor 120 is provided for each of the fiber tows 106. The sensors 120 may include optical, radiation, contact or non-contact sensors.

In the embodiment of FIG. 1, the automated manufacturing system 100 includes one or more clamping, feeding and guide components 122 and one or more cutting components 124 disposed in feed-through positioning with at least one compaction roller 126, configured to deliver a force to adhere the one or more fiber tows 106 to the layup surface 132 of the substrate 110 to form the composite structure 112 of the one or more laid up plies 114. The automated manufacturing system 100 may also include a heater 128, a tow guide scoop 130 and a positioning system (not shown) to orient the compaction roller 126 relative to the layup surface 132 of the substrate 110. In some embodiments, the automated manufacturing system 100 may be mounted on a robotic head (not shown) in front of the substrate 110, or mold, such that the one or more fiber tows 106 will adhere to the substrate 110 and pull the fiber feed through the layup system 102 when the automated manufacturing system 100 moves with respect to the substrate 110. It is noted that the automated manufacturing system 100 illustrated in FIG. 1 is an exemplary arrangement and the specific configuration of the automated manufacturing system 100 may vary based on the application.

Figure 2:
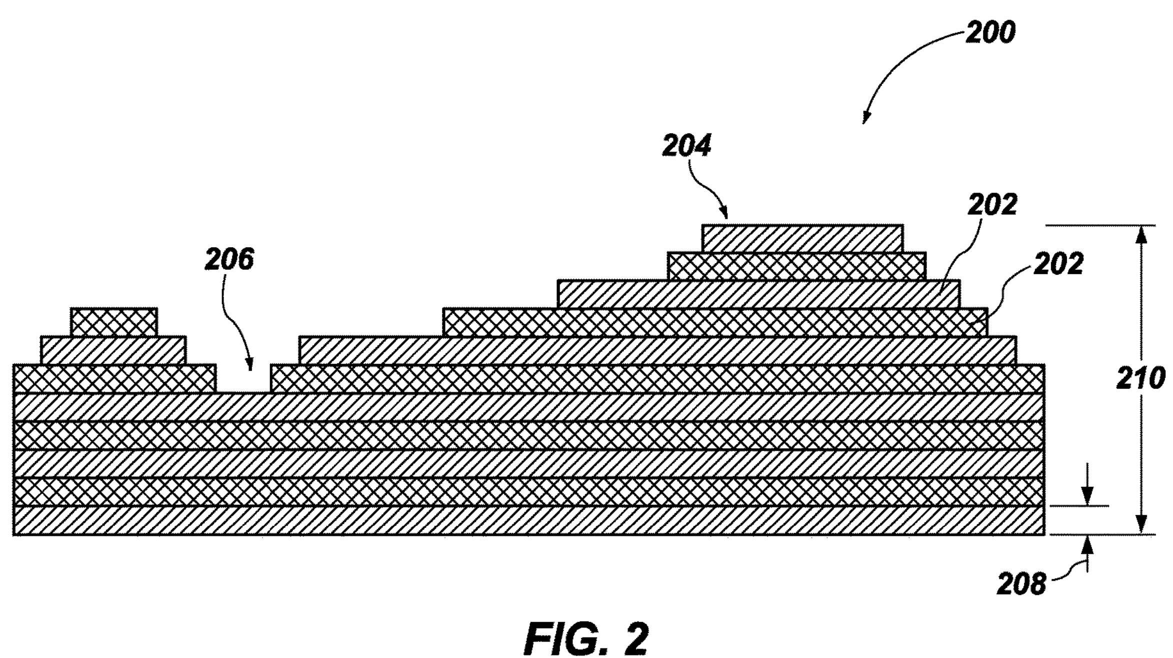
FIGS. 2 and 3 illustrate cross-sectional views of composite structures in accordance with embodiments of the disclosure.

FIG. 2 illustrates a simple cross-sectional view of a composite structure 200 formed by laying up multiple plies 202 of composite material. The composite structure 200 may include thick regions 204 and thin regions 206. The thick regions 204 and the thin regions 206 may be defined by a number of plies 202 in the respective thick regions 204 and thin regions 206. For example, the thick regions 204 may include more plies 202 than the thin regions 206.

The number of plies 202 and the position and shape of the plies 202 may define a cross-sectional shape of the associated composite structure. In the embodiment illustrated in FIG. 2, the thickness of the individual plies 202 is exaggerated for illustrative purposes. The individual plies 202 may have a ply thickness 208 in a range from about 0.001 inch (25.4 micrometers) to about 0.05 inch (1.27 millimeters), such as from about 0.005 inch (127 micrometers) to about 0.01 inch (254 micrometers), such that a change in thickness of the composite structure 200 from adding a single ply 202 is in the range from about 0.001 inch (25.4 micrometers) to about 0.05 inch (1.27 millimeters), such as from about 0.005 inch (127 micrometers) to about 0.01 inch (254 micrometers).

As discussed above, the individual plies 202 may each be manufactured to their respective manufacturing tolerances. The manufacturing tolerances may affect the individual ply thicknesses 208 during the layup process as illustrated in FIG. 2 as well as the ply thicknesses 208 after the composite structure 200 is cured. As discussed above, tolerance stack-up may multiply the effect of differences in the ply thickness 208 of the individual plies 202 with respect to a total thickness 210 of the associated composite structure 200 and/or final cured part. Furthermore, the tolerance stack-up may have a greater effect on the thick regions 204 of the composite structure 200 that include more plies 202 than the thin regions 206. For example, in the embodiment illustrated in FIG. 2, the thick region 204 includes twice as many plies 202 than the thin region 206, such that tolerance stack-up may have twice the effect on the total thickness 210 of the thick region 204 as the tolerance stack-up has on the total thickness of the thin region 206.

In instances where the ply thickness 208 is less than an expected ply thickness the tolerance stack up may result in a total thickness 210 that is less than the desired thickness. This may be corrected by applying additional plies 202 to achieve the desired thickness and/or by applying plies 202 from a different batch that have different characteristics configured to create a greater thickness, such as a different ply thickness 208, a different matrix percentage, a different fiber percentage, or a different matrix density, which may all affect the final cured thickness of the individual plies 202. In some cases, the added plies may be of a different type than the initial plies. For example, the initial plies may be a unidirectional carbon fiber pre-preg and the added plies may be bidirectional carbon fiber pre-preg material, or a glass fabric material.

In instances where the ply thickness 208 is greater than an expected ply thickness the tolerance stack up may result in a total thickness 210 that is greater than the desired thickness. This may be corrected by applying fewer plies 202 to achieve the desired thickness and/or by applying plies 202 from a different batch that have different characteristics configured to create a reduce thickness, such as a different ply thickness 208, a different matrix percentage, a different fiber percentage, or a different matrix density, which may all affect the final cured thickness of the individual plies 202.

After the plies 202 are laid up to form the composite structure 200, the composite structure 200 is cured through a curing process. The curing process may include heating the composite structure 200 and/or applying a pressure to the composite structure 200 to cure the matrix and bond the individual plies 202 in the composite structure 200 to one another to form a single solid composite structure. As indicated above, a final thickness of the plies 202 and a total thickness 210 of the composite structure 200 may change during the curing process. The change in the final thickness of the plies 202 may be determined by factors, such as the matrix percentage, the fiber percentage, the type of matrix, the matrix density, the surface roughness, the curing temperature, the curing pressure, the fiber orientation, how the matrix is applied (e.g., prepreg or dry fiber with matrix added during application), etc. As noted above, some of these factors, such as matrix percentage, fiber percentage, matrix density, surface roughness etc., may vary within the same product due to manufacturing tolerances. Similar to the tolerance stack up of plies 202 having different ply thicknesses 208, the effects of these factors on the final thickness of the individual plies 202 and the total thickness 210 of the composite structure post cure may also stack up to cause the total thickness 210 of the composite structure 200 to be outside of the engineering tolerances.

Figure 3:
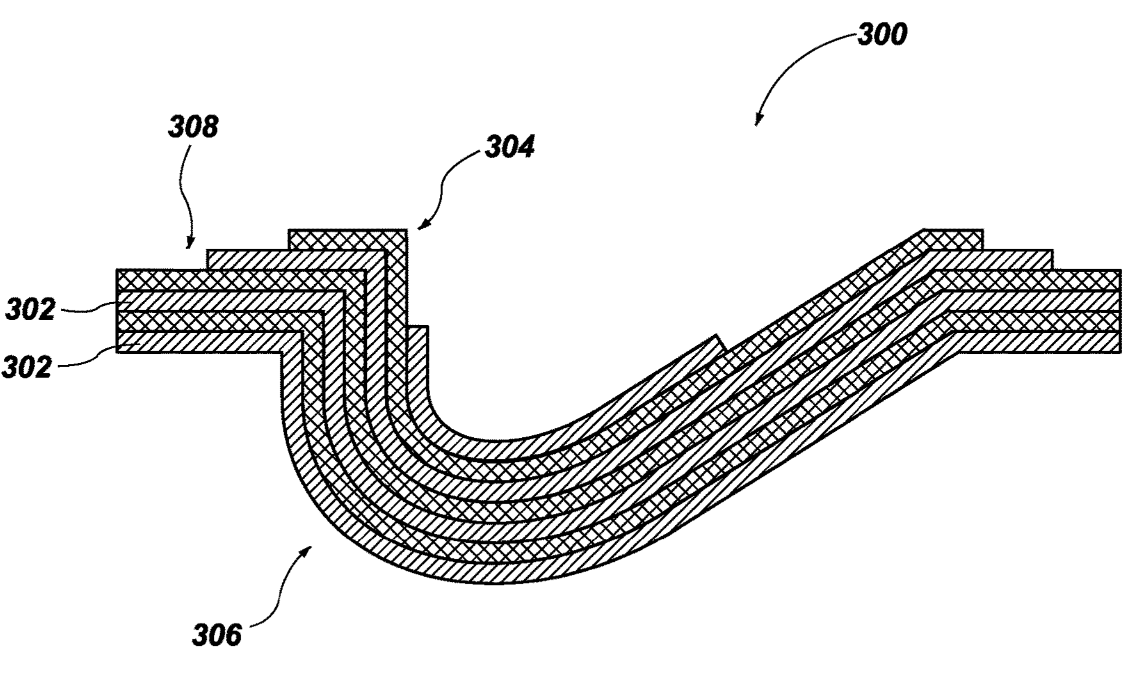

FIG. 3 illustrates another embodiment of a composite structure 300 formed by laying up multiple plies 302 of composite material. The composite structure 300 illustrated in FIG. 3 has a complex shape including flat regions 308, a corner 304, and a rounded surface 306. Similar to the composite structure 200 described above with respect to FIG. 2, the composite structure 300 may include thicker regions and thinner regions defined by a number of plies 302 in the respective regions.

The complex shape of the composite structure 300 may be defined by a mold (e.g., mandrel, buck, cavity, etc.) over which the plies 302 are laid up. In addition to the complex shape defined by the mold, the number of plies 302 and the position and shape of the plies 302 may further define a cross-sectional shape of the associated composite structure. In the embodiment illustrated in FIG. 3, the thickness of the individual plies 302 is exaggerated for illustrative purposes. The individual plies 302 may have a ply thickness in a range from about 0.001 inch (25.4 micrometers) to about 0.05 inch (1.27 millimeters), such as from about 0.005 inch (127 micrometers) to about 0.01 inch (254 micrometers), such that a change in thickness of the composite structure 300 from adding a single ply 302 is in the range from about 0.001 inch (25.4 micrometers) to about 0.05 inch (1.27 millimeters), such as from about 0.005 inch (127 micrometers) to about 0.01 inch (254 micrometers).

As discussed above, differences in the thickness of the individual plies 302 may have an exaggerated effect on the total thickness of the composite structure 300 in the respective positions due to tolerance stack up. In complex shapes, such as the composite structure 300 illustrated in FIG. 3, the transition regions, such as the corner 304 and the rounded surface 306 may exacerbate differences in the thickness of the individual plies 302 as well as other material properties, such as matrix percentage, fiber percentage, and matrix density. For example, two plies 302 having the same thickness but a different matrix density may conform to the corner 304 or rounded surface 306 in a different manner. Furthermore, during the curing process the matrix may migrate differently in the transition regions (e.g., corner 304 and the rounded surface 306), such that the thickness of the composite structure 300 in the transition regions experiences a different change in thickness than the flat regions 308. The difference in the matrix migration in the transition regions may also change based on properties of the matrix (e.g., matrix percentage and matrix density), such that minor differences in the matrix properties of the individual plies 302, that may be within manufacturing tolerances, will result in greater differences in the final thickness after the curing process.

The differences in final thickness based on the differences in material properties, material thicknesses, and the shape of the composite structure (e.g., composite structure 112, composite structure 200, composite structure 300) or underlying mold, may be stored in a database as historical data. The historical data may be used in conjunction with the measurements taken of the input material (e.g., the individual plies 202, plies 302, or fiber tows 106) to predict the final thickness of the associated composite structure and take corrective action during the layup process, such as adding additional input material to areas that are predicted to be less than the desired thickness, applying fewer plies of the input material to areas that are predicted to be greater than the desired thickness, or adding plies of material having different properties to account for the differences in the predicted thickness and the desired thickness. For example, as noted above the added plies may be of a different type than the initial plies. For example, the initial plies may be a unidirectional carbon fiber pre-preg and the added plies may be bidirectional carbon fiber pre-preg or a glass fabric material.

Figure 4:
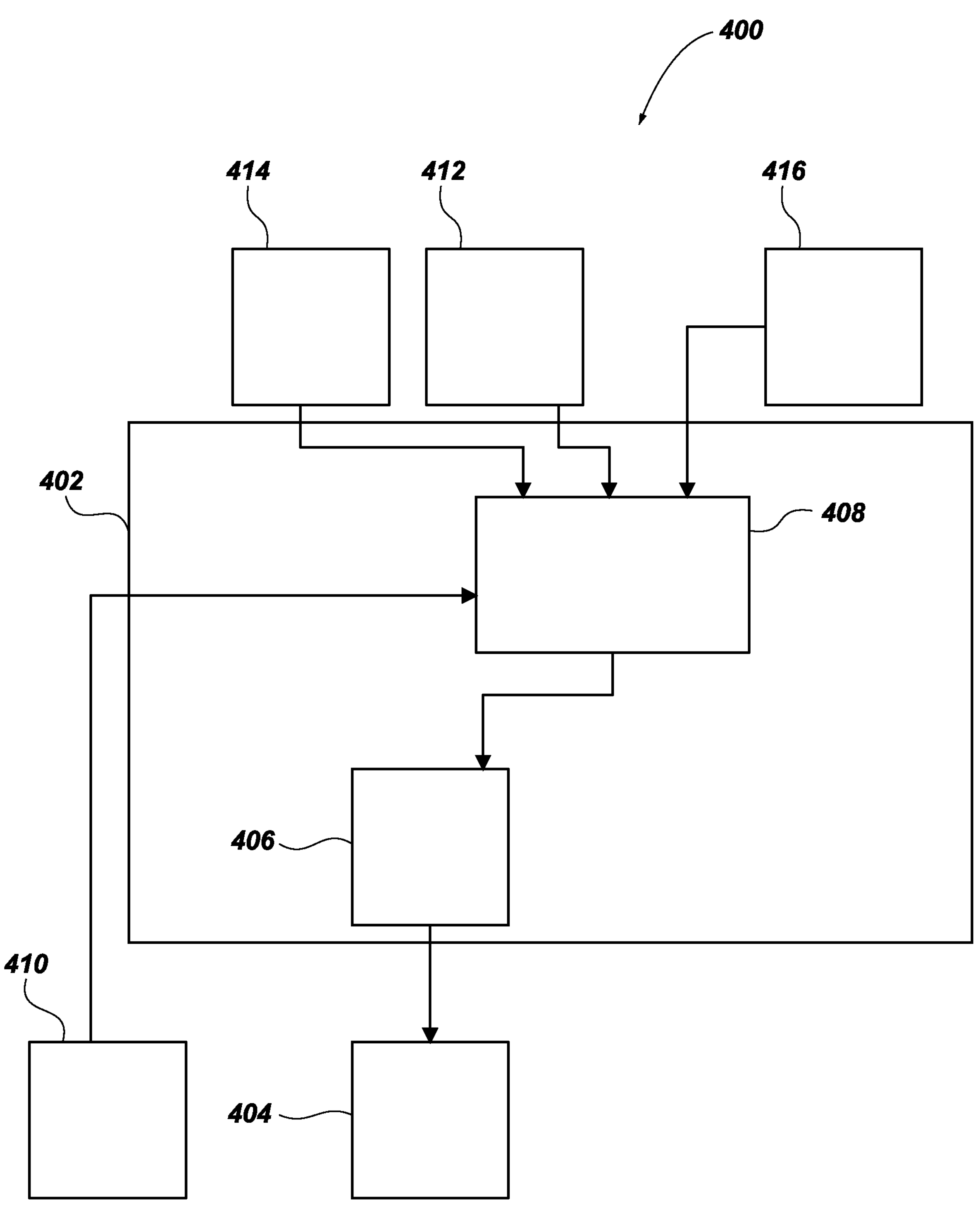
FIG. 4 illustrates a schematic view of a control system in accordance with embodiments of the disclosure.

FIG. 4 illustrates a schematic view of a control system 400 for an automated manufacturing system (e.g., automated manufacturing system 100 (FIG. 1)) for manufacturing composite structures through a layup process as described above. The control system 400 may include a controller 402, such as the controller 104 (FIG. 1) configured to control the tooling 404 (e.g., layup system 102 (FIG. 1), compaction rollers 126 (FIG. 1), spools 118 (FIG. 1), etc.). The controller 402 may include a processor 406 and a memory device 408. The processor 406 is configured to execute instructions received from the memory device 408 and control the tooling 404 based on the instructions.

The memory device 408 is a non-transitory computer-readable medium that is configured to receive and store information that is then provided to the processor 406. For example, the control system 400 may include one or more sensors 410 (e.g., sensors 120) configured to take measurements of different components during the layup process. For example, a sensor 410 may be configured to measure a ply thickness of the input material and transmit the measurement to the memory device 408. In another example, a sensor 410 may be configured to measure a composite structure thickness of the composite structure being formed during the layup process. In some embodiments, the sensor 410 may be configured to measure weights or volumes of the input material and/or the composite structure being formed.

The memory device 408 may also be configured to receive externally measured data 412. For example, samples of the input material may be taken to measure other properties of the input material, such as matrix density, matrix percentages, fiber percentages, matrix composition, etc. The material properties may then be input into the memory device 408, such as through a network connection or through a user interface. In some embodiments, the thickness and weight of the input material may be measured externally, such as from the samples, and input into the memory device 408 as externally measured data 412.

The memory device 408 may also receive historical data 414, such as the data from a database including differences in final thickness based on the differences in material properties, material thicknesses, and the shape of the composite structure. The historical data 414 may be gathered from previous layup operations using the same control system 400 and/or from different layup operations. The historical data 414 may include measurement data taken before a layup process, during a layup process, after a layup process, and after a curing process. The historical data 414 may be grouped such that measurements taken before the layup process, during the layup process, and after the layup process can be linked together and linked to measurements taken after the curing process of the same part to link the effects on the final dimensions of differences in the input material and layup process. Machine learning may be employed to identify correlations between material properties, composite structure properties, and final dimensions.

The memory device 408 may also receive a layup program 416. The layup program 416 may include a layup pattern, such as the number of plies to be applied in each region of the associated composite structure, the shape of the plies for each region of the composite structure, a map of positions for the specific plies, intermediary and final dimensions of the composite structure, etc.

The processor 406 may receive the layup program 416, the historical data 414, the externally measured data 412, and data from the sensor 410. The processor 406 may be configured to compare the measured data from the sensor 410 and the externally measured data 412 to the historical data 414 to determine if modifications to the layup program 416 are needed to meet the engineering tolerances for the composite structure. For example, the processor 406 may determine if the thickness of the input material is greater than or less than an expected thickness and may modify the number of plies in specific regions of the layup pattern to account for the difference in the actual thickness of the input material and the expected thickness. The processor 406 may also compare other properties of the input material, such as weight, matrix density, matrix percentage, fiber percentage, matrix composition, surface roughness to the historical data 414 to further predict differences in the expected final dimensions from the desired final dimensions of the layup pattern of the layup program 416. The processor 406 may then adjust the layup program 416 and the associated layup pattern to correct the expected final dimensions, such that the expected final dimensions are within the engineering tolerances of the desired final dimensions.

The processor 406 may then control the tooling 404 to form the associated composite structure in accordance with the adjusted layup program 416. In some embodiments, the adjustments to the layup program 416 may occur before the layup process begins. In other embodiments, the adjustments to the layup program 416 may occur while the tooling 404 is laying up the input materials to form the composite structure. For example, the processor 406 may adjust the layup program 416 during operation when a change in the material properties of the input material or a mid-process measured dimension of the composite structure result in a predicted final dimension that is outside the engineering tolerances of the desired final dimension.

Figure 5:
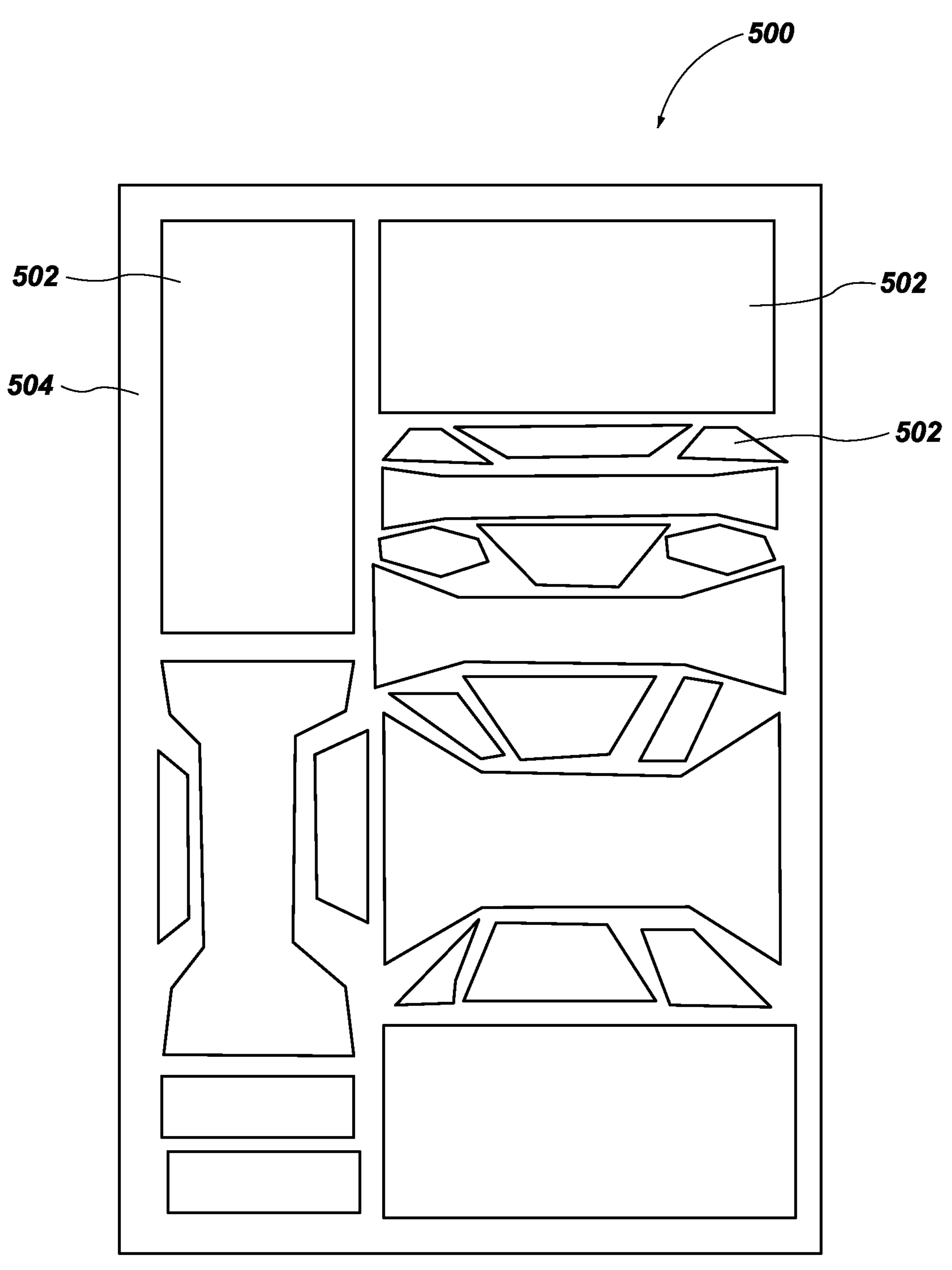
FIG. 5 illustrates a schematic view of a laser template in accordance with embodiments of the disclosure.

In some embodiments, the layup program (e.g., layup program 416) may define a laser template 500. The laser template 500 is a cutting pattern defining how a single sheet 504 of composite material is to be divided (e.g., cut) to form multiple pieces of composite material (e.g., plies 502) that can then be laid-up (e.g., stacked) by hand, machine, or other method to form a composite structure. The laser template 500 may include a size and shape of each of the plies 502 for building up a composite structure. The layup program 416 may also define a location map for each of the plies 502. As illustrated in FIG. 5, the laser template 500 may define the locations on a respective sheet 504 of composite material where each of the plies 502 are to be cut. This may facilitate a reduction in waste material by positioning each of the plies 502 relative to other plies 502 in a manner that maximizes the number of plies 502 cut from each sheet 504.

As illustrated in FIG. 5, the plies 502 have multiple different shapes and sizes. The different shapes and sizes may be selected to facilitate forming the composite structure to the desired thickness in the respective regions by shaping and positioning the plies 502 in a manner that results in the composite structure having more plies 502 in thicker regions than in thinner regions. The shape of the plies 502 may also be configured to facilitate conforming the plies 502 to a shape of the base material or mold.

As described above, the control system (e.g., control system 400 (FIG. 4)) may be configured to adjust the layup program to accommodate differences in material properties, such as thickness, matrix density, matrix percentage, fiber percentage, matrix composition, surface roughness etc. The control system may be configured to change the laser template 500, such as by changing a size or shape of one or more of the plies 502 to position addition material or less material in specific regions of the associated composite structure. In some embodiments, the control system may add additional plies 502 to the laser template 500 or remove plies 502 from the laser template 500 to facilitate adding plies 502 or reducing plies 502 in specific regions of the associated composite structure. In some embodiments, such as where the sheet 504 does not have a uniform thickness, the laser template 500 may be adjusted to cut specific plies 502 from regions having different thicknesses to facilitate better matching the thickness of the individual plies 502 to specific regions of the composite structure to facilitate better matching the final desired dimensions.

Figure 6:
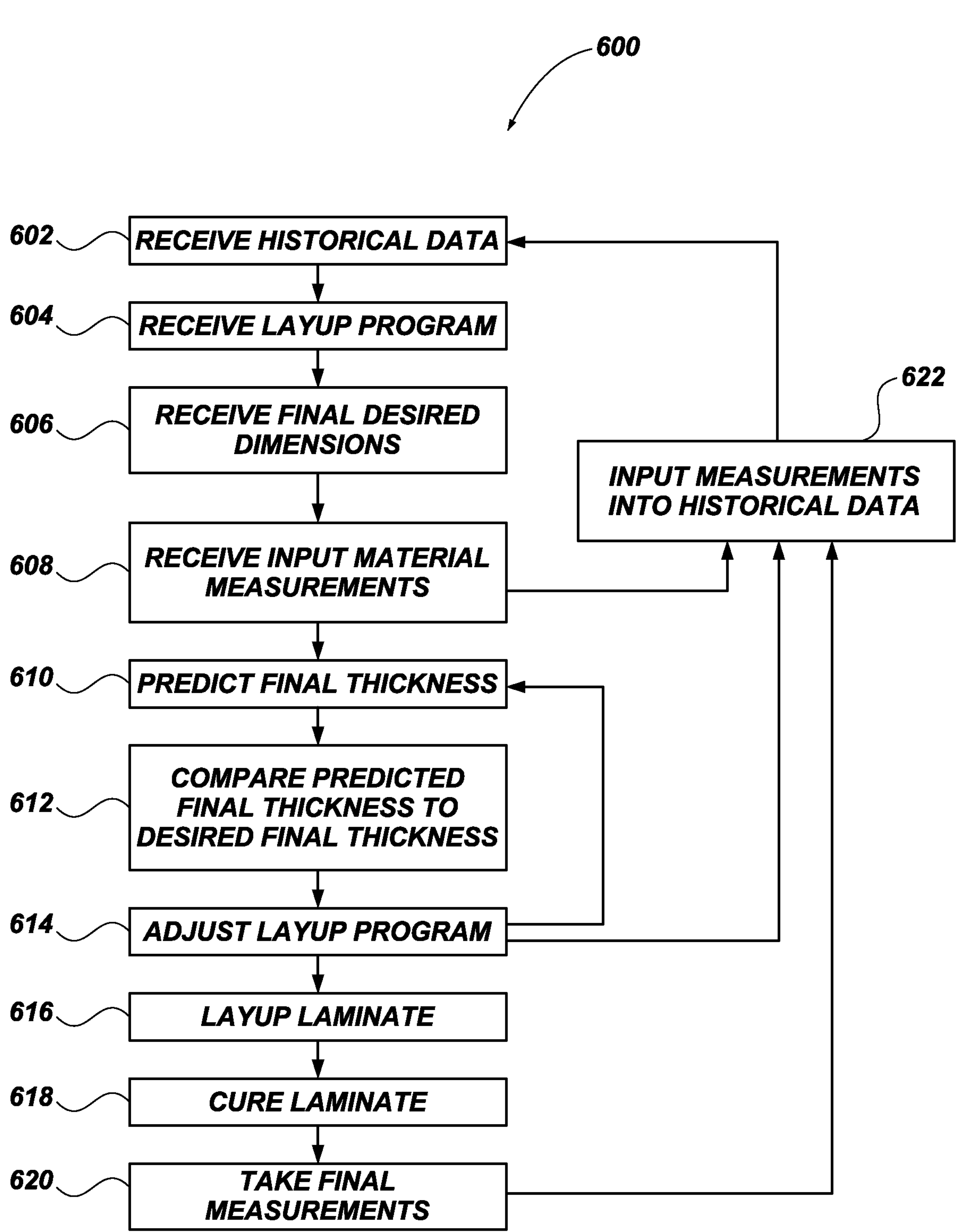
FIG. 6 illustrates a flow chart representative of a method of forming a composite structure in accordance with embodiments of the disclosure.

FIG. 6 illustrates a flow chart representative of a method 600 of forming a composite structure. The method 600 includes receiving historical data in act 602. The historical data may include differences in final thickness based on the differences in material properties, material thicknesses, and the shape of the composite structure. The historical data may be gathered from previous layup operations. The historical data may include measurement data taken before a layup process, during a layup process, after a layup process, and after a curing process. The historical data may be grouped such that measurements taken before the layup process, during the layup process, and after the layup process can be linked together and linked to measurements taken after the curing process of the same part to link the effects on the final dimensions of differences in the input material and layup process.

The method 600 also includes receiving a layup program in act 604. The layup program may include a layup pattern, such as the number of plies to be applied in each region of the associated composite structure, the shape of the plies for each region of the composite structure, a map of positions for the specific plies, intermediary and final dimensions of the composite structure, etc. In some embodiments, the layup program includes a laser template (e.g., laser template 500 (FIG. 5)) that defines where individual plies are cut from a sheet of input material.

The method 600 also includes receiving final desired dimensions of the associated composite structure in act 606. As noted above, the final desired dimensions may be received as part of the layup program in act 604. In other embodiments, the final desired dimensions are received separately. The final desired dimensions may include engineering tolerances, that include differences in dimensions from the final desired dimensions that are acceptable for the final product.

The method 600 further includes receiving input material measurements in act 608. In some embodiments, receiving the input material measurements includes taking input material measurements, such as thickness measurements or weight measurements. In some embodiments, receiving the input material measurements includes receiving measurements that are measured externally, such as in a separate process. The material measurements may include thickness, weight, matrix density, matrix percentage, fiber percentage, matrix composition, surface roughness etc.

After receiving the historical data, layup program, and input material measurements in acts 602, 604, and 606, the method 600 includes predicting a final thickness of the composite structure based on the layup program, the input material measurements, and the historical data in act 610. The predicted final thickness may be for a final thickness of the composite structure after the curing process. The predicted final thickness may initially be based on the layup program with the input material measurements. As indicated above, if the material measurements are different than the expected material measurements, the final thickness of the composite structure may be different. The predicted final thickness will account for the differences in measurements from the expected measurements. The historical data may be used to account for differences in the cured thickness of the composite structure for different material properties. For example, the historical data may be used to determine predicted differences in thickness of the cured composite structure for different matrix densities, different matrix compositions, different matrix percentages, different fiber percentages, different surface roughness or texture, etc. A model hierarchy may be used to predict the thickness of the cured composite structure. For example, analytical, empirical, and phenomenological models may be used to predict the thickness of the cured composite structure as a function of a first-order phenomena. The phenomena may be identified and ranked in a ranking table in the historical data based on their respective influence on the thickness of the composite structure. The phenomena may include the thickness, weight, matrix density, matrix percentage, fiber percentage, matrix composition, surface roughness, fiber nesting, matrix flow, porosity, curing pressure, debulk data, lay-up techniques, etc.

After predicting the final thickness in act 610, the final thickness is compared to the final desired dimensions in act 612. Comparing the predicted final thickness to the final desired dimensions includes comparing the predicted final thickness in multiple different locations along the composite structure. For example, the composite structure may have multiple different thicknesses across the composite structure defined by the number of plies in the layup program. In some embodiments, the shape of the underlying mold, defined in the layup program, may affect the final predicted thickness based on differences in the matrix densities, different matrix compositions, different matrix percentages, different fiber percentages, etc., as discussed in further detail above.

If the predicted final thickness from act 610 is not within the engineering tolerances of the final desired dimensions received in act 606, or of the thickness is different than a desired target thickness, the layup program is adjusted in act 614. The layup program may be adjusted by adding or removing plies from specific regions based on the input material measurements received in act 608. In some embodiments, the layup program is adjusted by adjusting the laser template to change a shape or number of specific plies. In some embodiments, the layup program is adjusted by adjusting the laser template to positions specific plies in specific regions of the associated sheet, where the properties of the sheet (e.g., thickness, weight, matrix density, matrix percentage, fiber percentage, surface roughness, etc.) are not uniform throughout the sheet. After adjusting the layup program in act 614, a new final predicted thickness may be predicted by repeating act 610 and the new predicted final thickness may be compared to the final desired dimensions in act 612. If the new predicted final thickness is not within the engineering tolerances of the final desired dimensions received in act 606, the process may be repeated by further adjusting the layup program in act 614 and predicting a new final predicted thickness in act 610 and re-comparing the new final predicted thickness to the final desired dimensions in act 612.

If the new predicted final thickness is within the engineering tolerances of the final desired dimensions received in act 606, the method 600 may then proceed to performing the layup process in act 616. Additional measurements may be taken during the layup process. For example, mid-process composite structure thickness measurements may be taken and recorded. In some embodiments, some properties of the input material are measured during the layup process, which may capture variations in material thickness or weight that may not have been captured when the input material measurements were received in act 608. In some embodiments, the mid-process measurements may be used to calculate additional predicted final thicknesses in act 610 and the acts 610, 612, and 614 may be repeated as needed to continue to provide a predicted final thickness within the engineering tolerances of the final desired dimensions.

In some embodiments, the added or removed material is grouped into a number of packages or layup adjustment programs with fixed geometry based on historical data. For example, the historical data may include common combinations of material properties and may store the corrections (e.g., changes in ply numbers, shapes, and orientations) that result in the desired dimensions as common packages. The processor may select the common package to achieve the desired dimensions when the measured material properties align with the properties associated with the common packages, which may further reduce processing time.

After performing the layup process in act 616, the composite structure is cured in act 618. The curing process may include heating the composite structure under pressure to cure the matrix and cause the matrix in adjacent plies to bond to one another bonding the plies together to form one composite structure. As noted above, the curing process may change dimensions of the composite structure. For example, as the individual plies are compressed together and bonded together, the thickness of the composite structure may be reduced. Furthermore, in parts having complex dimensions, the matrix may migrate small distances within the composite structure depending on different properties of the matrix, such that some regions may increase in thickness while other regions decrease in thickness.

After the curing process in act 618, final measurements of the composite structure are taken in act 620. The final measurements may then be compared to the final desired dimensions received in act 606 to determine if the final composite structure is within the engineering tolerances of the final desired dimensions. If the final measurements are not within the engineering tolerances, finish machining may be used to remove material as needed or additional plies may be laid up on the structure. Reducing the amount of finish machining or plies added may reduce the cost of producing the associated composite structure. By predicting the final thickness and adjusting the associated layup program the method 600 may composite structures that are within the engineering tolerances with little to no corrective actions following the curing process.

The final measurements taken in act 620, the input material measurements received in act 608, any mid-process measurements, and the adjustments to the layup program made in act 614 may then be added to the historical data in act 622. The additional data may be grouped together to provide better predictions in future processes. Thus, as additional parts are built, the historical data may facilitate better predictions and reduce or eliminate the corrective actions needed to meet the engineering tolerances.

The engineering tolerances for composite structures built for high-performance applications, such as high-performance aircraft, high-performance automobiles, turbine engines, turbines, etc., may have relatively small engineering tolerances that may be difficult to achieve with the manufacturing tolerances of the associated composite materials due to tolerance stack up that may result in finished parts that do not meet the associated engineering tolerances. When parts do not meet the associated engineering tolerances after the parts are cured, the parts must go through finish machining processes to remove material or additional layup and curing processes that are both expensive and time consuming processes. The embodiments of the disclosure may provide parts that are closer to the final desired dimension, such that redundant thickness inspections, finish machining processes (e.g., sanding, grinding, etc.), and additional layup processes (e.g., bagging, autoclave cure, debagging) may be reduced or even eliminated reducing the cost and time for producing the associated parts. The embodiments of the disclosure may improve the ease of manufacturing the composite structures.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. An automated manufacturing system for controlling layup of a composite part, the automated manufacturing system comprising:

- a layup system configured to receive one or more fiber tows as an input material and lay up the one or more fiber tows to form a composite structure of one or more laid up plies;
- one or more sensors configured to measure properties of the one or more fiber tows while the layup system is feeding the one or more fiber tows to a substrate; and
- a controller configured to:
  - receive the properties of the one or more fiber tows measured by the one or more sensors;
  - receive external measured data associated with the properties of the one or more fiber tows, the external measured data including one or more of a matrix density, a matrix percentage, a fiber percentage, a matrix composition, or a surface roughness;
  - compare the properties of the one or more fiber tows measured by the one or more sensors and the external measured data to historical data including data gathered from previous layup operations of composite parts; and
  - adjust a feed-through of the one or more fiber tows during the layup, including adjusting a number of plies being laid up to compensate for a variation in the layup as provided by the properties of the one or more fiber tows measured by the one or more sensors during the layup.

2. The automated manufacturing system of claim 1, wherein the one or more sensors are configured to measure a thickness of the one or more fiber tows.

3. The automated manufacturing system of claim 1, wherein the controller is configured to receive a layup program including initial instructions for the feed-through of the one or more fiber tows.

4. The automated manufacturing system of claim 3, wherein the layup program includes an initial number of plies for each section of the composite structure and a final desired thickness for each section of the composite structure.

* * * * *